United States Patent [19]

Johnston

[11] Patent Number: 5,027,489
[45] Date of Patent: Jul. 2, 1991

[54] MULTIPLE PISTONS SWAGING TOOL

[75] Inventor: Lonnie E. Johnston, Bedford, Ohio

[73] Assignee: Crawford Fitting Company, Solon, Ohio

[21] Appl. No.: 419,958

[22] Filed: Oct. 11, 1989

Related U.S. Application Data

[63] Continuation-in-part of Ser. No. 198,775, May 25, 1988, Pat. No. 4,873,755.

[51] Int. Cl.⁵ .................................................. B23P 19/04
[52] U.S. Cl. ..................................... 29/237; 29/282; 72/453.03
[58] Field of Search ................. 29/235, 237, 282, 516, 29/517, 520, 407; 72/316, 317, 318, 36, 402, 412, 61, 453.02, 453.03, 453.05; 73/761; 91/389, 396, 466

[56] References Cited

U.S. PATENT DOCUMENTS

| | | | |
|---|---|---|---|
| 1,039,096 | 9/1912 | Christenson | 29/237 |
| 2,605,751 | 8/1952 | Perry et al. | 91/389 |
| 2,667,035 | 1/1954 | Marsden | 91/396 X |
| 3,072,174 | 1/1963 | Vanderhoof | 29/237 |
| 3,156,284 | 11/1964 | Stanley | 29/282 |
| 3,385,087 | 5/1968 | Huth | 72/36 |
| 3,568,494 | 3/1971 | Geisman | 72/402 |
| 3,691,604 | 9/1972 | Spontelli | 29/237 |
| 3,722,064 | 3/1973 | Spontelli | 29/237 |
| 3,726,122 | 4/1973 | Dawson | 72/412 |
| 3,728,771 | 4/1973 | Spontelli | 29/237 |
| 3,752,040 | 8/1973 | Pawloski et al. | 91/466 X |
| 3,771,343 | 11/1973 | Dawson | 29/237 X |
| 3,786,677 | 1/1974 | Spontelli | 73/761 |
| 3,810,296 | 5/1974 | Spontelli | 29/407 |
| 3,848,451 | 11/1974 | Allin | 72/402 |
| 3,991,601 | 11/1976 | Duncan | 72/453.02 X |
| 3,996,784 | 12/1976 | Champoux et al. | 72/453.05 X |
| 4,308,736 | 1/1982 | Lowe et al. | 72/36 |
| 4,331,019 | 5/1982 | Smith | 72/402 |
| 4,470,280 | 9/1984 | Kelly | 72/61 |

FOREIGN PATENT DOCUMENTS

| | | | |
|---|---|---|---|
| 2317757 | 10/1974 | Fed. Rep. of Germany | 29/237 |
| 2033811 | 5/1980 | United Kingdom | 29/237 |

Primary Examiner—Timothy V. Eley
Assistant Examiner—Peter Dungba Vo
Attorney, Agent, or Firm—Fay, Sharpe, Beall, Fagan, Minnich & McKee

[57] ABSTRACT

A device for swaging a ferrule onto the periphery of a cylindrical member includes a first piston mounted for reciprocation within a body and an anvil member drivingly connected to the first piston. The anvil member has a recess at one end to receive an end of the cylindrical member. A camming device is associated with the anvil member for camming a ferrule carried on the end of the cylindrical member into tight peripheral engagement. A second piston is mounted for reciprocation within the body in spaced relation to the first piston. A movement of the second piston is necessary in order to move the first piston. Located between the first and second pistons are an unexpandible chamber which contains a constant amount of fluid and a spring for resiliently urging the pistons away from each other.

50 Claims, 5 Drawing Sheets

FIG. IA

MULTIPLE PISTONS SWAGING TOOL

This application is a continuation-in-part of application Ser. No. 198,775 filed on May 25, 1988 now U.S. Pat. No. 4,873,755.

The subject invention is directed toward the coupling art. More specifically, the present invention is directed to an improved apparatus for swaging ferrules to the outer surface of elongated cylindrical members.

The invention is especially suited for use in swaging ferrules of tube fittings and will be described with particular reference thereto. However, it should be appreciated by those skilled in the art that the invention is capable of broader applications and could be used for attaching ferrules to many types of cylindrical members.

Tube or pipe fittings which employ one or more swaged ferrules on the periphery of a tube to make metal to metal seals at a joint are in widespread use. Experience has shown that the swaged ferrule type fittings with their metal to metal sealing surfaces are particularly effective in providing strong leak-tight joints. In swage type tube fittings, the grip of a swaged ferrule on the periphery of the tube is critical to the proper functioning of the fitting. Typically, the nose portion of the ferrule must be forced radially inward to achieve a good grip on the tube but without extensive tube deformation.

With fittings currently in use, the ferrules are typically swaged into sealing position by a manual tightening of a coupling nut which forces the nose portion of the ferrule against a camming mouth in an associated body member. The camming mouth deforms the nose radially inward into tight sealing engagement with the periphery of the tube or rod being coupled.

Power actuated ferrule swaging devices are known to the art. Generally, these prior art devices have been somewhat complicated and cumbersome and have required die blocks and the like for engaging the ferrules and cooperating with a die member to perform the swaging operation. Generally, such power actuated swaging devices are used with large sized tubes or tubes formed of very hard material in order to apply the necessary swaging torque since for these applications it is difficult to get the necessary torque by a manual operation.

One problem with manually swaging ferrules on a conduit has been the difficulty of inexperienced operators in judging when adequate swaging has taken place. Another problem with a manual swaging of ferrules has been the length of time it takes to adequately swage a ferrule on a tube or pipe. This tends to be a problem when numerous swaging operations need to take place on a complicated conduit system of the type that is generally used on vehicles, such as airplanes or trucks.

While power actuated ferrule swaging devices might indicate when adequate swaging has taken place and might reduce the length of time the swaging operation takes, they have their own problems. For one, currently available swaging devices do not have an indicator means to let the operator know when a ferrule has been put in backwards or has been omitted entirely. Additionally, the conventional power actuated ferrule swaging devices utilize a coupling nut or female body portion of the fitting into which the swaged tube will be received to assist the swaging operation by threading the nut into engagement with a sleeve held on the tool. This operation is time consuming since the nut needs to be threaded onto the sleeve before the swaging operation and off the sleeve after the swaging operation.

Additionally, with the presently utilized power operated swaging tools which have an indicator arm cooperating with an indicator knob to form a latch mechanism, the knob needs to be readjusted for each swaging operation and this extra step adds to the length of the swaging operation.

Another disadvantage of conventional swaging tools is that they are incapable of precisely controlling the swaging operation when a rapid swaging is desired, for example, when swaging numerous fittings one after the other.

Accordingly, it has been considered desirable to develop a new and improved swaging tool which would overcome the foregoing difficulties and others while providing better and more advantageous overall results.

BRIEF SUMMARY OF THE INVENTION

In accordance with one aspect of the present invention, a device for swaging a ferrule onto the periphery of a cylindrical member is provided.

More particularly in accordance with this aspect of the invention, the device comprises a first piston mounted for reciprocation within a body and an anvil member drivingly connected to the first piston. The anvil member has a recess in one end to receive an end of the cylindrical member. A camming means is associated with the anvil member for camming a ferrule carried on the end of the cylindrical member into tight peripheral engagement therewith. A second piston is mounted for reciprocation within the body in spaced relation to the first piston. A movement of the second piston is necessary in order to move the first piston.

According to another aspect of the invention, an apparatus is provided for swaging a ferrule onto the periphery of a cylindrical member.

More particularly in accordance with this aspect of the invention, the apparatus comprises a first piston mounted for reciprocation within a body and an anvil member cooperatively associated for movement with the first piston. A cylindrical recess in the anvil member receives one end of a cylindrical member. The anvil member also includes a camming mouth. A means is carried by the body for connection thereto of a means for (a) aligning the cylindrical member with the recess and (b) limiting an axial movement of a ferrule received over the end of the cylindrical member and a coupling nut received over the ferrule wherein the means for aligning the cylindrical member and limiting axial movement of the ferrule wherein the means for aligning the cylindrical member and limiting axial movement of the ferrule and the coupling nut comprises a retaining cap slidably disposed in a T-shaped slot which is provided on the body. A pressure means is connected in fluid communication with the interior of the body for driving the first piston toward the ferrule. The pressure means comprises a second piston.

In accordance with still another aspect of the invention, an apparatus is provided for pre-swaging to the outer surface of a cylindrical member the ferrules of fittings of the type including a threaded coupling nut having an internal opening and adapted to encircle the cylindrical member and an associated ferrule positioned on the cylindrical member.

More particularly in accordance with this aspect of the invention, a first means is provided for engaging and positioning the end of the cylindrical member on which the fitting is connected. A camming means is associated with the first means and is sized to extend inwardly from the end of the member between the outer periphery of the member and the internal opening of the coupling nut. A second means engages the coupling nut. The second means comprises a retaining cap that is slidably disposed in a T-shaped slot such that the cap selectively encloses the coupling nut. A power means is provided for producing relative movement toward one another of the camming means and the coupling nut in order to cause a ferrule positioned therebetween to be swaged on the outer surface of the cylindrical member. The power means comprises a first piston and a second piston spaced from the first piston.

In accordance with yet another aspect of the invention, a swaging tool is provided for swaging a ferrule onto the outer periphery of a cylindrical member.

More particularly in accordance with this aspect of the invention, the tool comprises a swaging anvil for swaging the ferrule onto the periphery of a cylindrical member and a frame for supporting and aligning the swaging anvil with the cylindrical member. The swaging anvil can selectively move with respect to the frame. An independently actuated signal means is provided for indicating adequate swaging of the ferrule in response to a gauged relative movement between the frame means and the swaging anvil. The signal means includes an articulated signal member comprising a first arm and a second arm which is secured to one end of the first arm and is selectively pivotable thereabout. A means is provided for urging the second arm to one end position in relation to the first arm. A latching means secures the signal member in one end position. A means is provided for biasing the signal member to swing away from the one end position upon an adequate swaging of the ferrule.

In accordance with an additional aspect of the invention, a method is provided for swaging a ferrule onto the periphery of a tube or rod.

More particularly in accordance with this aspect of the invention, the method comprises mounting a nut and a ferrule onto the periphery of a tube or rod and inserting the end of the tube or rod into a swaging tool. The nut is then enclosed in a retaining cap mounted on the tool in order to (a) align the tube or rod with a camming mouth within the tool and (b) limit the axial movement of the ferrule. A force is then applied to cause a relative movement between the ferrule and the camming mouth in order to swage the ferrule into tight engagement with the periphery of the tube or rod.

One advantage of the present invention is the provision of a new and improved swaging tool.

Another advantage of the present invention is the provision of a swaging tool having a pair of cooperating pistons each located in its own chamber and actuated by its own fluid. This allows for a precise gauging of the swaging action performed on an associated ferrule.

Still another advantage of the present invention is the provision of a swaging tool in which a retaining cap is used to retain the nut and ferrules in place on the tool thus eliminating the necessity of threading the nut on and off the tool. This speeds up the operation of the swaging unit and permits the outer diameter of the swaging anvil to be significantly increased which helps eliminate a flaring of the swaging mouth of the anvil due to the use thereof.

Yet another advantage of the present invention is the provision of a swaging tool in which the swaging anvil can be replaced without having to disassemble the tool. Such a construction reduces the anvil cost and allows the tool to be easily modified with a new anvil whenever necessary.

A further advantage of the present invention is the provision of a swaging tool with an indicator arm that can be set without having to rotate an associated indicator knob in and out in order to set the arm. This speeds up the operation of the swaging tool.

A still further advantage of the present invention is the provision of a swaging tool which allows a fast and accurate swaging of a ferrule onto a tube or pipe.

A yet further advantage of the present invention is the provision of a swaging tool which can be easily adapted to swage ferrules on tubes or pipes of different diameters.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein:

FIG. 1A is an enlarged cross-sectional view of a left end portion of the swaging tool of FIG. 1;

DETAILED DESCRIPTION OF THE PREFERRED EMBODIMENT

Figure 1:
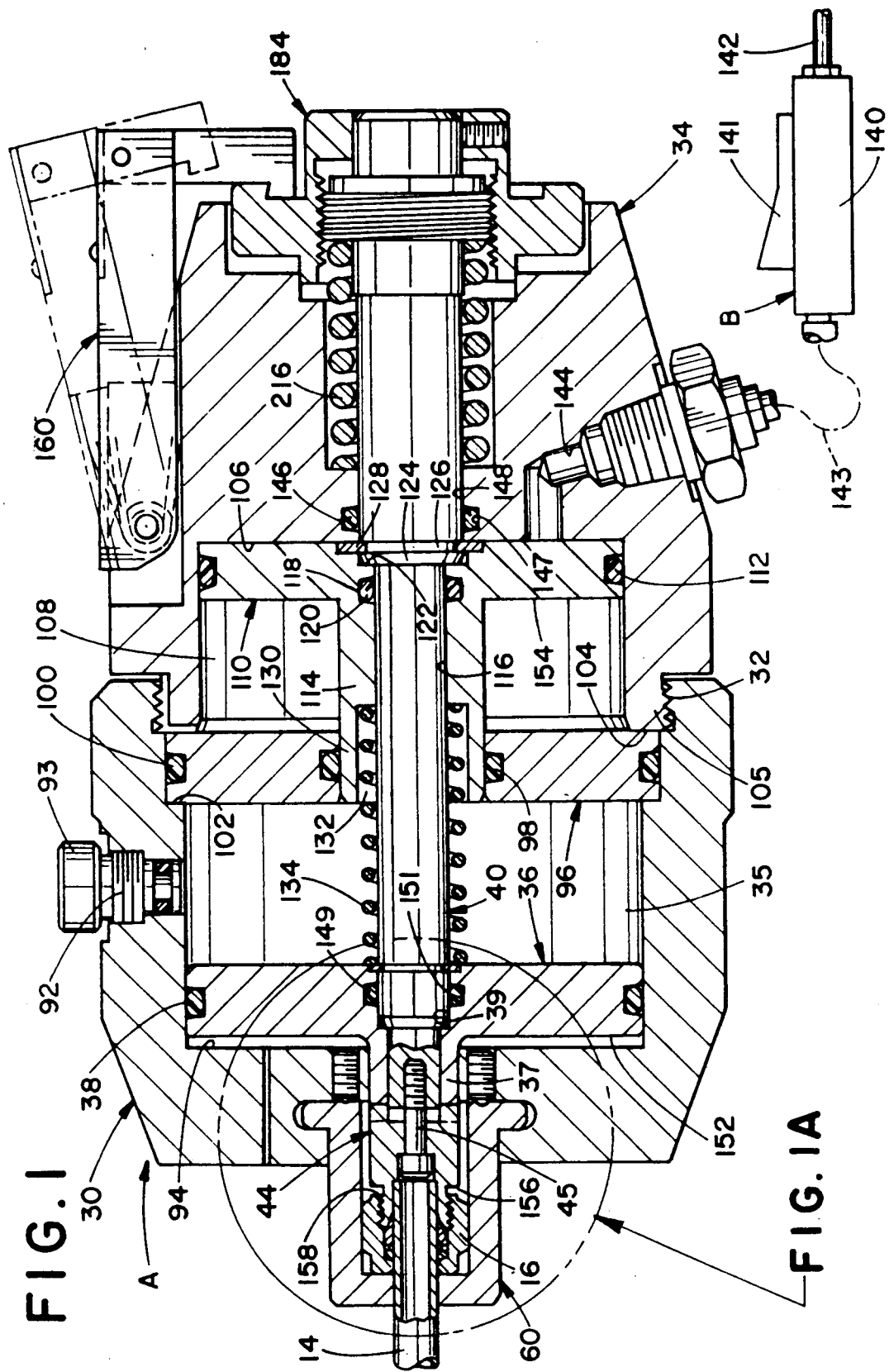
FIG. 1 is a side elevational view in cross-section of a first preferred embodiment of the subject new swaging tool connected to a fluid pump.

Referring now to the drawings wherein the showings are for purposes of illustrating a preferred embodiment of the invention only and not for purposes of limiting same, FIG. 1 shows the subject new swaging tool A together with a pressurized fluid control means B which is operatively connected thereto. While it is to be appreciated that the device could be used for setting or swaging ferrules on many types of elongated cylindrical members, it is shown in FIG. 1A of the drawings as being used to swage a pair of ferrules 10, 12 to the outer peripheral surface of a pipe or tube 14. In the particular embodiment shown, the ferrules are of a specific type. It is to be appreciated, however, that the specifics of the ferrules or their use is not critical to the present invention's concept.

A nut 16 which encircles the ferrules 10, 12 as well as the pipe 14 is a coupling nut component of the fitting into which the pipe 14 is ultimately to be received. The nut 16 has a threaded opening 18 which surrounds both ferrules 10, 12 and, when correctly positioned, is located adjacent an end portion of the pipe 14.

Although the swaging tool A could have a variety of different constructions, in the embodiment under consideration, as shown in FIG. 1, it includes a body having a cylindrical front housing 30 which is threadedly connected at 32 to a back housing 34. Carried within the front housing 30, held in a first chamber 35 defined therein, and arranged for reciprocation in the chamber is a first piston 36 having a hub portion 37. A suitable packing or piston ring means 38 is carried about the outer periphery of the first piston 36 in order to provide a seal with a wall of the chamber 35 defined in the front housing. Extending through a bore 39 defined in the first piston 36 is a left hand end of a shaft 40. With reference again to FIG. 1A, a movement of the first piston 36 in relation to the shaft 40 is limited in one direction of motion by a snap ring 42. Carried at the left hand end of the shaft 40 is an anvil-like swaging or camming member or body die 44 which is drivingly connected to the end of the shaft 40 by a fastener 45.

It can be seen that a front face 46 of the hub portion 37 of the first piston 36 abuts against a rear face 47 of the anvil 44 to hold the piston in place. Extending inwardly from the left end of the anvil 44 is a recess 48 which is sized so as to closely receive the end of the tube 14 and align it with the cylinder housing 30. The end of the tube 14 is seated on a shoulder section 50 of the anvil 44 with the shoulder being defined between the recess 48 and a smaller diameter bore 52. The anvil is further provided with a tapered swaging or camming surface 54 which forms a camming mouth that functions to swage or cam a forward nose portion 56 of the first ferrule 10 inwardly and into tight sealing gripping engagement with the periphery of the tube 14 in a manner to be described.

In the embodiment shown, the apparatus is used for pre-swaging the ferrule of a standard tube fitting. As shown, the nut 16 is the female body portion of the tube fitting and its internal threaded opening 18 surrounds the tube and the ferrules. In the subject device, unlike the prior art swaging tools, the nut 16, while it is utilized to assist in the swaging operation, is not secured by its threads to the swaging tool.

Figure 2:
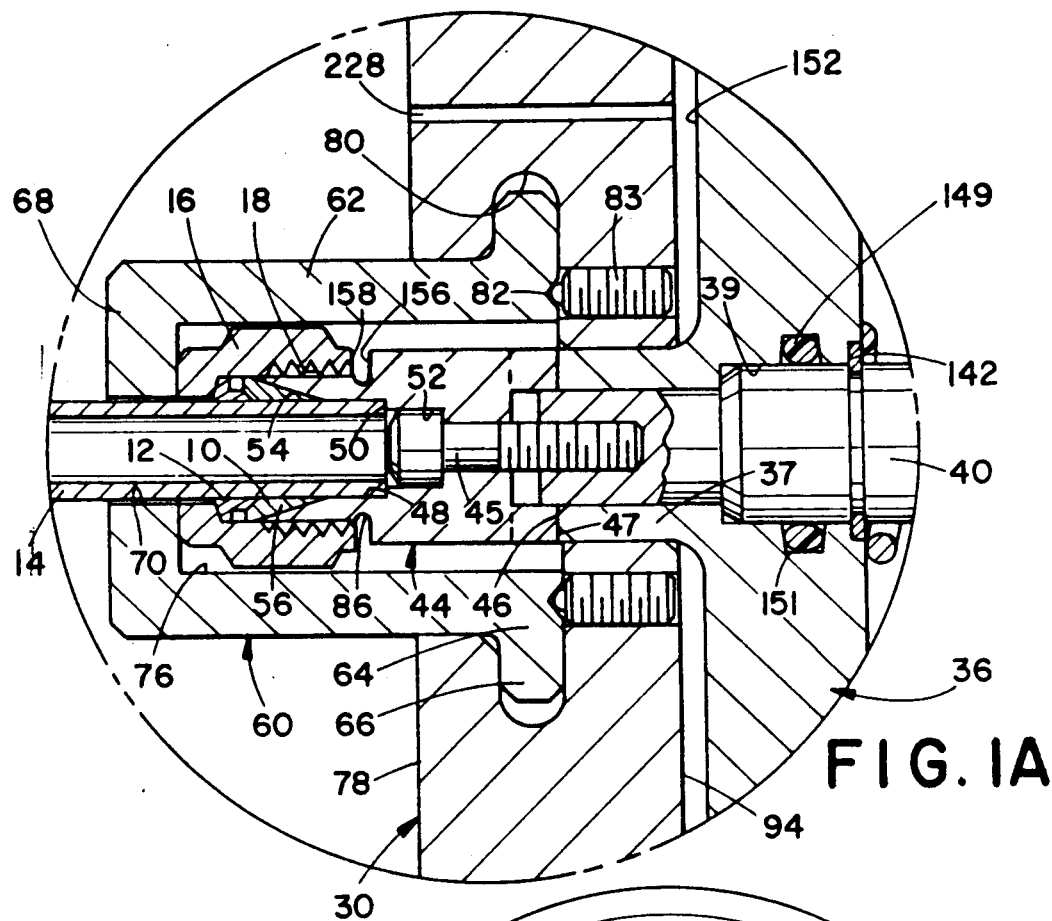
FIG. 2 is an end elevational view of a left end of the swaging tool of FIG. 1.

Instead, a nut retaining cap 60 is employed to hold the nut 16 in place. The retaining cap comprises an annular body portion 62 having a first end 64 which is provided with an outwardly flaring section 66 and a second end 68 which extends radially inwardly of the annular body portion to form a centrally disposed U-shaped aperture 70 to allow the tube 14 to extend therethrough. With reference now also to FIG. 2, the cap in general has a closed bottom section 72 and an open top section 74 to allow the cap to slide in one direction in relation to the tube. A cavity 76 is formed in the cap 60 to receive the nut 16. The cavity 76 has a diameter of sufficient dimension to house the nut 16. The retaining cap outwardly flaring end 66 is so dimensioned as to slide in the front housing 30. For this purpose, cut into an end face 78 of the front housing is a T-shaped slot 80 in which the flaring end section 66 of the retaining cap 60 can be accommodated.

In order to hold the retaining cap in a predetermined position, the cap is provided with a pair of recesses 82 (FIG. 1A) which are adapted to cooperate with first and second pairs of ball detent mechanisms 83, 84 that are threadedly secured in the cylinder housing 30 in a spaced manner and are positioned so that a ball portion of each extends into the T-shaped slot 80 of the housing. In use, the retaining cap 60 can be moved from an operative position during which it surrounds the tube 14 and the nut 16, and is held in place by the detents 83, to an inoperative position during which the cap is prevented from sliding out of the slot 80 due to gravity by the detents 84. If desired, a pin 85 can be suitably secured to the cylinder 30 at the bottom of the slot 80 to prevent the cap 60 from falling out of the slot. In fact, the second set of detents 84 can be eliminated in favor of the pin 85 if desired.

In the inoperative position of the cap 60, the tube 14, the nut 16 and the ferrules 10, 12 can be positioned in place on the tool A or removed therefrom after the swaging operation has taken place. It is to be appreciated that the provision of the retaining cap allows for a quick removal of the tube 14, the ferrules 10, 12, and the nut 16 without having to unthread the nut as in the prior art swaging tools. This construction also allows the nut threads to remain unused until they are connected to a male portion of a tube fitting (not illustrated). While the retaining cap 60 is surrounding the tube 14 and the nut 16, a relative movement can be produced between the nut 16 and the anvil 44 for the required swaging of the ferrules 10, 12, into engagement with the outer surface of the tube 14.

With reference again to FIGURE IA, it is also noted that a groove 86 can circumscribe the outer periphery of the anvil 44 at a selected location thereon. The groove is advantageous in order to serve as an indicating means to indicate whether both ferrules 10, 12 have been correctly positioned on the tube 14 when the nut 16 is slipped over them and the retaining cap 60 securely holds the nut in place against the body 30. If one of the ferrules is omitted, then the nut 16 will slide past the groove 86 to visually indicate that one of the ferrules is missing before the operator conducts the swaging operation. If, on the other hand, one of the ferrules, for example, the ferrule 10 is slipped on the tube 14 backwards, then the nut will not be able to slide up to the groove 86. This will indicate that there is a problem and that the tube 14 should be removed and the ferrules checked. Also, in the latter situation, the retaining cap 60 will likely not be able to slide over the nut into the operative position of the cylinder 30 that is shown in FIG. 1A.

Many different power arrangements could be utilized for producing a required relative movement; however, according to the embodiment under consideration, it is preferable to use a compound power means which includes a dual piston structure actuated by two fluids. In the embodiment illustrated the first fluid is a relatively incompressible hydraulic fluid and the second fluid is a compressible fluid such as air. However, it should be appreciated that other combinations of fluids could also be used as desired.

More specifically, the first piston 36 is actuated by hydraulic fluid which fills the chamber 35 through an inlet 92 sealed by a cap 93. It is noted that the chamber 35 is defined between a forward wall 94 of the front housing 30 and a toroidal wall member 96 spaced therefrom and oriented parallel therewith. The wall member 96 includes on its inner and outer peripheries respective seal members 98 and 100 to prevent the flow of fluid therepast. The wall member 96 is held in position between a shoulder 102 defined on an inner periphery of the front housing 30 and a forward face 104 of an annular flange 105 defined on the rear housing 34. Accordingly, the first piston 36 reciprocates in the chamber 35 between the walls 94 and 96.

Defined between the wall 96 and a shoulder 106 of the rear housing 34 is a chamber 108 which adapted to hold a second piston 110 for reciprocating movement therein. A suitable packing or piston ring means 112 is carried about the outer periphery of the piston 110 in order to provide a seal with the internal wall of the chamber 108. It can be seen that the second piston 110 includes a hub portion 114.

The piston also includes a longitudinally extending bore 116 for slidably accommodating the shaft 40 extending therethrough. A recessed section 118 is provided in the bore 116 for accommodating an inner seal element 120 around the shaft 40 to prevent fluid flow along the shaft. Spaced from the section 118 is a shoulder section 122 which accommodates an enlarged portion 124 of the shaft 40. A groove 126 in the shaft enlarged portion 124 accommodates a snap ring 128 for preventing a rearward movement of the shaft 40 in the rear housing 34.

Located on a leading edge of the hub portion 116 is an annular flange portion 130 which defines a recessed area 132. Adapted to be held in the recessed area is one end of a suitable biasing means such as a first compression spring 134. The spring extends between the first piston 36 and the second piston 110 in order to resiliently bias the two pistons away from each other.

The second piston 110 is actuated by the conventional pressurized fluid control means B which includes a foot operated air valve 140 controlled by a rocker pedal 141. The rocker pedal can be actuated forward in order to allow a pressurized charge of air to flow from a pressurized air supply source 142 into the rear housing 34 in order to urge the piston 110 forward. A rearward actuation of the rocker pedal 141 will allow the charge of air to be vented out of the body 34. When the pedal 141 is pushed forward, the pressurized air flows through a conduit 143, a suitable fitting and an air passage 144, which extends through the rear housing 34, to the rear face 106 of the chamber 108 holding the second piston 110. Consequently, the second piston will be urged forward, i.e., to the left in FIG. 1. While a pressurized air supply controlled by a valve is illustrated in FIG. 1, it should be appreciated that other fluid supply means such as a pump, actuated either manually or by a motor, could be substituted as the pressurized fluid source for the second piston 110 if desired.

A suitable packing means 146 is accommodated in a groove 147 communicating with a bore 148 extending through the rear housing 34. The packing means 146 seals between the rear housing 34 and the shaft 40 in order to isolate the chamber 108 from the environment. The plane through the first piston 36 is sealed by the packing 38 and a suitable second packing 149 which is provided in a grooved section 151 communicating with the bore 39 extending through the first piston 36. In this way, the front chamber 35 behind the first piston 36 and in front of the wall 96 is also sealed.

The piston and its chamber are so designed that a front face 152 of the first piston 36 can bottom out against the wall 94 of the cylinder 30 when an adequate swaging has taken place thereby eliminating any possibility of overswaging. Similarly, a front face 154 of the second piston 110 can bottom out against the wall 96 when the piston 110 has traveled the correct amount. The correct amount of travel is the amount necessary in order to urge the first piston forward by a minimum of 0.0625 (0.1588 cm.)inches in order to correctly swage the ferrules 10 and 12 onto the tube 14. In order to eliminate any possibility of overswaging, it may also be desirable to have a front face 156 of the anvil or body die 44 bottom out against a forward face 158 of the nut 14.

The surface areas of the first and second pistons are so related that a surface area of hub portion 130 of the second piston 110 which extends, or can extend, into the first chamber 35 in order to pressurize the fluid held therein is smaller than a surface area of a rear face of the first piston 36. The ratio should be at least 5 to 1 and preferably the hub portion 130 has a surface area which is approximately 1/13th the surface area of the first piston rear face. In this way, upon actuation, the second piston will travel 13 times as far as will the first piston. In other words, the second piston 110 will travel a substantial amount into the first chamber 35 to pressurize the hydraulic fluid held therein. The pressurized hydraulic fluid will then act upon the first piston 36 urging it toward the wall 94. Consequently, the first piston 36 will move to the left in FIG. 1 a small amount. This will in turn move the anvil 44 forward the appropriate amount in order to swage the ferrules.

Preferably, it will only take one actuation of the rocker pedal 141 in order to allow enough compressed air into the chamber 108 so as to urge the second piston 110 toward the wall 96 to conduct the swaging operation.

It should be noted that with the construction illustrated in the present invention, the anvil-like member and the first piston 36 can be readily removed from the shaft 40. More specifically, the anvil-like member 44 can be disengaged from the end of the shaft 40 simply by removing the fastener 45. This permits the anvil to be replaced externally without a complete disassembly of the tool. The removal of the anvil 44 may be necessary when a modification thereof may be needed to custom fit the anvil for each tool and eliminate a stack up of tolerances to reduce any variation in operation. Also, the anvil may need to be replaced when the camming surfaces thereof have become worn. Furthermore, the piston 36 can be removed from the shaft 40 simply by removal of the anvil 44 and of the front housing 30 from the rear housing 34.

It is also noted that in the embodiment illustrated, the anvil 44 has an outer diameter so sized that it just does fit into the nut 16. This relative sizing of the two components is made possible by the provision of the retaining cap 60 so that the nut does not have to be threaded onto the swaging tool A. Increasing the thickness of the anvil helps to eliminate a skirt-like expansion of the anvil camming or swaging surface 54 during the use thereof thereby increasing its surface life.

Also of importance in speeding up the swaging operation is the inventive signalling or indicating arrangement which provides both a visual and an audible signal when the proper amount of relative movement has taken place between the camming surface 54 and the nut 16. The specific details of the indicating means could take a variety of particular forms; however, in the preferred embodiment, and with reference now to the cross-sectional view of FIG. 3, it includes a signal or lever arm 160 which is mounted for pivotal movement on a pin 162 that extends between the walls of a slot 164 cut into the rear housing 34. The signal arm 160 is arranged for pivotal movement between the solid and dotted line positions shown in FIG. 1.

Preferably, means are provided to maintain the arm under a continual bias. Although the biasing means may take many forms, in the embodiment illustrated it preferably comprises a coil spring 170 which extends about the pin 162 and has opposite end portions engaged with the rear housing 34 and the signal arm 160. It will be noted that the signal arm 160 is provided with a longitudinally extending slot 172 in which the spring can be received.

A latching means is provided for holding the signal arm 160 in the solid line position. The latching means is shown as including a groove 182 formed in one face of a knob 184. An annular flange or outwardly extending portion 186 borders on the outer edge of the groove 182. In the preferred embodiment, the flange has an approximately 5° taper which slopes inwardly toward the groove.

The lever arm 160 is provided with a first arm section 190 which is pivotally connected to a second arm section 192 by a pivot pin 194. The free end of the second arm section 192 is provided with a tooth 196 which projects inwardly and is adapted to be received under the flange 186 and in the groove 182 in order to maintain the lever arm 160 in the solid line position. A flat spring 198 is secured on the first arm section by a fastener 199 to bias the second arm section 192 to one end position in relation to the first arm section 190, namely an orientation substantially normal to the first arm.

The knob 184 is secured on the shaft 40 through the use of a threaded section 202 provided on the shaft and a corresponding threaded area 204 provided on a section of an inner bore 205 of the knob. Provided on a rear section of the knob 184 and extending through a bore 206 therein is a set screw 208 which fastens the knob against a reduced diameter section 210 on the shaft 40. The knob 184 is moved axially on the shaft 40 by means of the cooperating threaded sections 202, 204 at time of assembly of the tool, as needed so that the latching means functions correctly and is thereafter secured in place by the set screw 208. In other words, the knob is preferably adjusted at the factory so that the length of engagement of the tooth 196 of the lever arm 160 in the groove 182 of the knob 184 is the appropriate amount to indicate adequate swaging. The flange 186 then holds the arm 160 in place against the bias of the spring 170.

In the embodiment shown, the first piston 36 and the shaft 40 are normally biased to the right as viewed in FIG. 1 by a second compression spring 216 positioned about the shaft 40. One end of the second spring 216 abuts a shoulder 218 formed by a counterbore 220 in the rear housing 34. The other end of the spring abuts an inner face 222 of the shaft threaded section 202. Thus, when fluid pressure is relieved behind the second piston 110, and hence behind the first piston 36, the spring 216 will bias the shaft 40, and the first piston, but not the second piston, to the right in FIG. 1. It should be noted in this regard that the second spring 216 is considerably stiffer than is the first spring 134. In one embodiment, for example, the second spring 216 is ten times as strong as is the first spring 134.

In operation, the nut 16 is mounted on the tube followed by the ferrules 10, 12. The tube end is then inserted into the cavity 48 of the anvil-like member 44. Thereafter, the retaining cap 60 is slid upwardly from its storage position to its active position so that it surrounds the tube and the nut 16. Preferably, a fluid, such as hydraulic fluid has already been supplied in the appropriate amount to the first chamber 35 behind the first piston 36.

The measured swaging operation can thereafter begin by supplying pressurized air to drive the second piston 110 forward so that the hub section 130 thereof enters the first chamber 35. In the embodiment shown, the second piston 110 is normally biased to the right (as viewed in FIG. 1) by the spring 134 as mentioned. Thus when fluid pressure is received behind the second piston 110, the second piston will move against the bias of the spring 134 and toward the first piston 36. This will then force the first piston 36 to move to the left as viewed in FIG. 1. The first piston 36, and the anvil member 44 secured thereto, are urged toward the ferrules 10, 12 to cause the camming mouth or camming surface 54 of the anvil 44 to engage the nose portion 56 of the front ferrule 10 and swage it radially inward against the tube 14. Preferably, the second piston 110 will move toward the left in FIG. 1 until it bottoms out against the wall 96.

With reference again to FIG. 3, in order to allow air to flow out of the second chamber 108 ahead of the advancing piston 110, a suitable slot 224 is provided on the forward face 104 of the body 34 and communicating with a suitable slot 226 extending across the threading 32 between the cylindrical member 30 and the body 34. Similarly, if desired, and as shown in FIG. 1A, a suitable bore 228 of narrow diameter can be provided through the front housing or cylinder member 30 to enable air to leave the space between the wall 94 and the front face of the first piston 36 as the first piston advances.

It is to be appreciated that the groove 182 is precisely cut to a particular depth which is at least equal to the needed relative axial movement between the camming surface 54 and the nut 16. This distance is predetermined to provide the desired swaging of the ferrules 10, 12 onto the tube 14. As mentioned, the swaging movement should be a minimum of 0.0625 (0.1588 cm.) inch. In operation, the piston moves from right to left relative to the signal arm 160, as shown in FIG. 1. This movement, of course, also moves the knob 184 an equal amount. When the first piston 36 has moved the desired measured distance to the left (which as mentioned can be equal to the length of engagement of the tooth 196 with the knob groove 182) it will release the tooth 196 from the groove and the lever arm 160 can then swing upwardly to the dotted line position as urged by the spring 170. This will produce both a visual and an audible signal indicating that the desired amount of swaging has been performed.

Thereafter, the operator can release the pressure in the piston chamber 108 by pushing the rocker pedal 141 on the valve 140 to the rear. This will release the pressurized air in the chamber 108 through the valve 140, through a suitable aperture in the valve housing (not illustrated). The shaft 40 and the anvil-like member 44 will then be biased back towards the right by the spring 216 since the air pressure acting against the second piston 110 has been removed. Accordingly, all pressure against the cap 60 by the anvil 44 pushing on the nut 16 has ceased. Then the retaining cap 60 can be slid downwardly away from the tube 14 in order to allow the tube as well as the nut and the now swaged ferrules to be removed from the swaging tool A.

After the now swaged tube 14 has been removed from the swaging tool, the anvil-like member 44 is ready for another swaging operation.

It should be noted that if inadequate hydraulic pressure is developed by the leftward movement of the second piston 110 into the first chamber 35, then the first piston 36 will not move far enough forward to correctly swage the ferrules 10, 12 onto the tube 14. This will be evident to the operator since the signal arm 160 will not be released as the shaft 40 and the knob 184 secured thereto will not move forward the required distance. Such inadequate pressure could be the result of insufficient hydraulic fluid in the first chamber 35. Adding more fluid to the chamber will cure this problem. It should be appreciated that even if too much hydraulic fluid is added, no over-swaging will result if either the front piston 36 bottoms out against the cylinder rear wall 94 or if anvil forward shoulder 156 bottoms out against the nut face 158, as described above.

Figure 3:
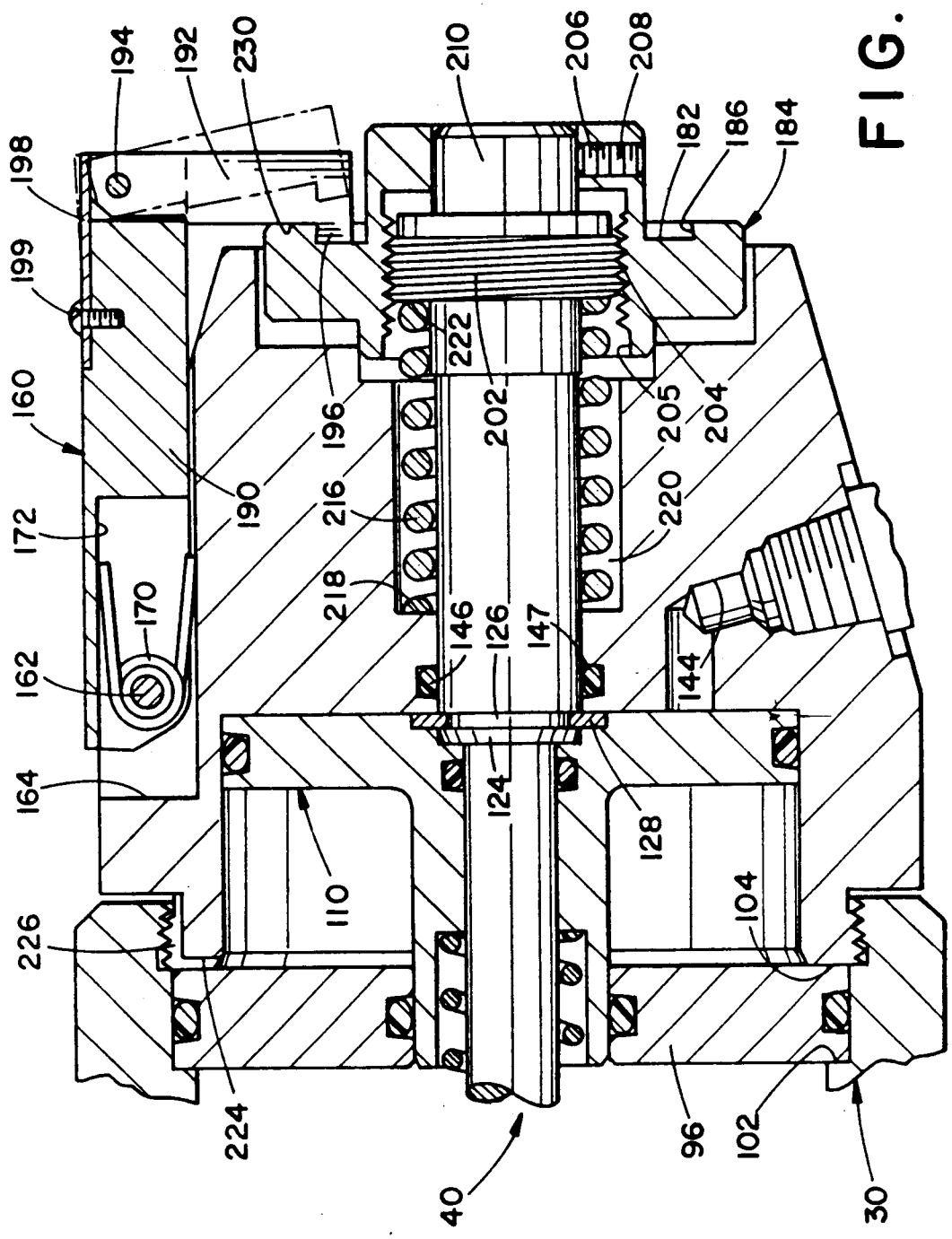
FIG. 3 is an enlarged side elevational view in cross-section of a portion of the right end of the swaging tool of FIG. 1.

When the air pressure is released in the chamber 108, the second spring 216 will bias the shaft 40 and the first piston 36 to the right in FIG. 1. When this happens, the knob 184 secured on the far end of the shaft 40 will return to its initial position. At this time, it would be desirable to resecure the lever arm 160 to the knob 184. Unlike the prior art swaging tools in which the knob had to be rotated inwardly towards the tool in order to allow the protuberance on the lever arm to pass freely down past the flange and into the groove, in the present invention, the lever arm 160 is provided with the flat spring 198 which enables the second arm section 192 to pivot outwardly in relation to the first arm section 190 thereby allowing the tooth 196 to clear the flange 186 on the knob 184, as is illustrated in FIG. 3. After the tooth has cleared the flange, the second arm section 192 will be biased inwardly by the spring 198 so that the tooth engages in the groove 182.

It is apparent that the measured distance needed to cause adequate swaging could be gauged by a relative movement between other parts of the assembly. It is noted that the length of the measured travel could be controlled by any combination of the three bottoming actions previously discussed, namely the bottoming of the second piston 110 against the wall 96, the bottoming of the first piston 36 against the wall 94 and the bottoming of the anvil 44 against the nut 14. Additionally, the length of the measured travel of the signal arm could be controlled by the depth of the groove 182 or by the length of the tooth 196. For example, the groove could be considerably deeper and the tooth 196 of a length equal to the desired swaging distance. In this case, the flange portion 186 would abut a landing 230 (FIG. 3) on the second arm 192 at the beginning of the swaging cycle. The length of the tooth 196 would then determine the length of the relative movement between the nut 16 and the camming surface 54.

It is anticipated that the entire swaging operation with the present device will take approximately one second. In other words, it will only take one second to swage the ferrules 10, 12 onto the tube 14 using the two piston arrangement disclosed herein. It is also anticipated that the entire process of correctly locating the tube 14, ferrules 10, 12 and nut 16 so that the cap 60 can be pulled up around them in order to swage the ferrules onto the tube and afterwards removing the cap and the now swaged tube should take approximately 15 seconds or so. Accordingly, three or four such tubes can be swaged per minute.

Figure 4:
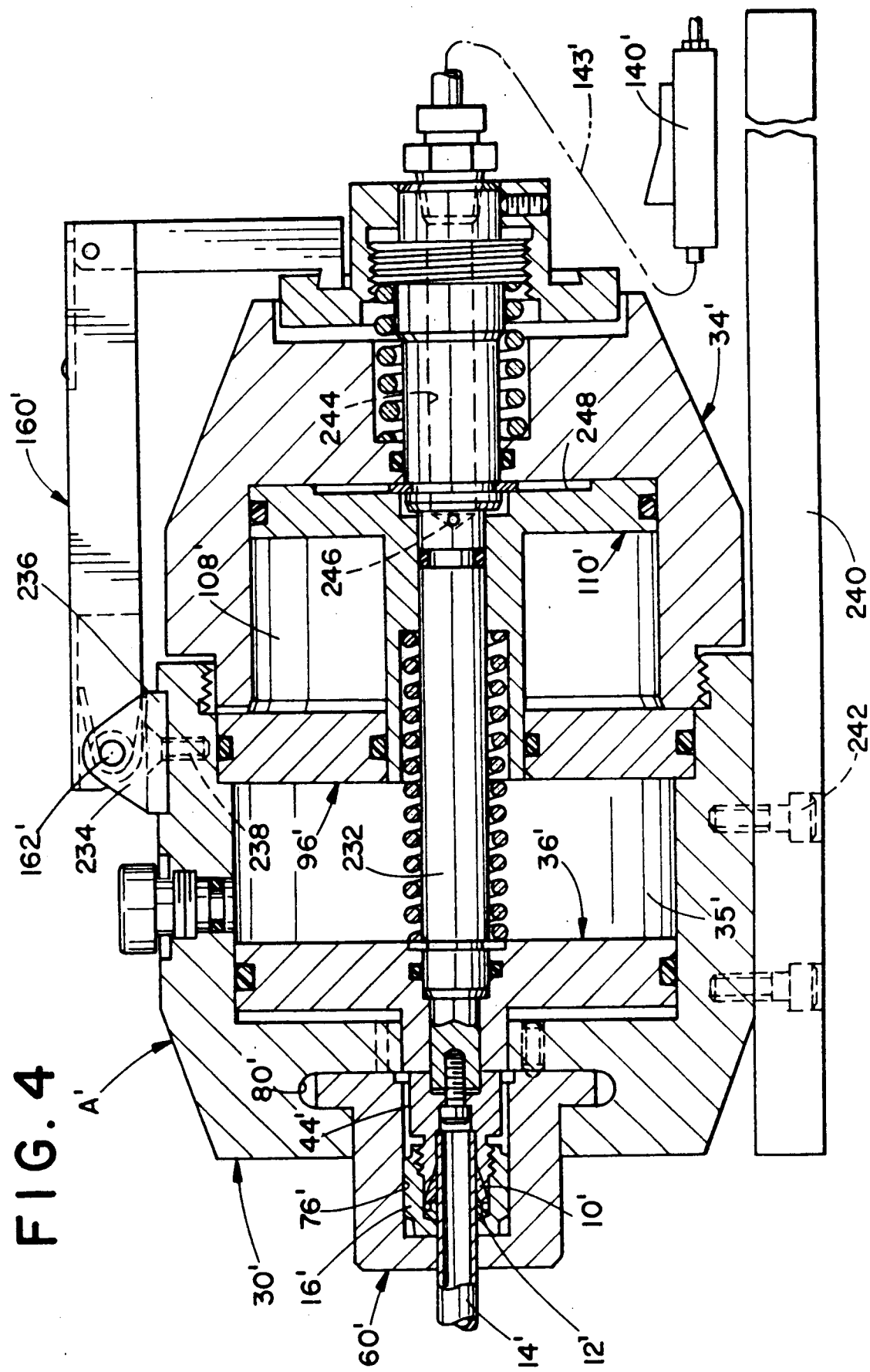
FIG. 4 is a side elevational view in cross-section of a second preferred embodiment of the subject new swaging tool, with a retaining cap and adjacent body portion being illustrated as being 90° out of phase for the sake of clarity; and, FIG. 5 is an exploded perspective view of a retaining cap construction according to another preferred embodiment.

It would be advantageous if a number of different anvils or body dies of different internal diameters could be utilized so that tubes ranging in diameter from, e.g., ¼ inch (0.635 cm.) up to ½ inch (1.27 cm.) could be swaged. FIG. 4 illustrates a tool A' which can be used for this purpose. For ease of comprehension and appreciation of this preferred embodiment, like components will be identified by like numerals with a primed (') suffix and new components will be identified by new numerals.

As in the previous embodiment, the tool A' includes a front housing 30' secured to a rear body 34'. Defined within these two elements and separated by a wall 96' is a first piston chamber 35' and a second piston chamber 108'. Disposed for reciprocation in the first chamber 35' is a first piston 36' and similarly disposed in the second chamber 108' is a second piston 110'.

As in the embodiment of FIGS. 1–3, slidably disposed in a T-shaped slot 80' formed in the front housing 30' is a cap or nut retainer 60' for selectively holding a nut 16' mounted on a tube 14'. Suitable ferrules 10', 12' are also located on the tube. These ferrules are adapted to be swaged into contact with the tube by an anvil 44' which is secured to a shaft 232. In this embodiment, a plurality of anvils 44' of differing diameters are provided together with caps 60' of differing diameters in order to accommodate tubes 14' and nuts 16' of differing diameters preferably ranging from ¼ inch (0.635 cm.) up to ½ inch (1.27 cm.). In other words, a cavity 76' within the cap 60' is in each case suitably sized in diameter so as to just receive the corresponding nut 16' meant to be housed therein. Accordingly, a plurality of different caps of different internal cavity diameters will be provided, each one being adapted to house a nut of a suitable diameter.

It should also be noted that in this embodiment, a signal arm 160' can be secured on a pin 162' which extends between a pair of legs 234 of a bifurcated bracket 236 fixed to the cylindrical housing 30' by a suitable fastener 238. The lever arm 160' operates in the same manner as has been set forth above.

In this embodiment, it is also illustrated that the device can be secured to a suitable base 240 by conventional fasteners 242.

In order that the body 34' can be secured to the cylindrical housing 30' in any orientation, the air for actuating the second piston 110' is admitted directly through the shaft 232. For this purpose, a suitable bore 244 extends from the rear end of the shaft and terminates adjacent the second piston 110. One or more apertures 246 extend radially outwardly from the bore 244 and terminate at the outer periphery of the shaft 232 in the second chamber 108' and behind the piston 110'. A suitable valve 140' is connected through a conduit 143' and a fitting to the bore 244. In this embodiment, an enlarged landing 248 is provided on a rear surface of the second piston 110 in order to aid in initially moving the piston from its rest position where it contacts a rear face of the chamber 108' by allowing the pressurized air to work on a larger diameter portion of the piston.

One advantage of having a symmetrical rear housing 34' is that the housing can be more quickly and inexpensively manufactured in this way. Also, it can be mounted in any orientation in relation to the front housing 30'.

In this embodiment, the rear piston 110' has a forward extending hub 114' which is of a smaller diameter than in the first embodiment illustrated in FIGS. 1–3. In the present embodiment, the hub diameter is approximately 15/16ths of an inch (2.38 cm) whereas in the first embodiment the hub diameter was one inch (2.54 cm). The forward piston 36' is, however, of the same diameter as in the first embodiment. Accordingly, this gives a ratio of working surfaces of the first and second pistons 36' and 110' of 16.38 to 1 in contrast to the 13 to 1 ratio of working surfaces of FIGS. 1-3. Accordingly, the rear piston or air actuated piston is capable, in this embodiment, of developing a thrust of 11,000 lbs. at an air pressure of 100 psi (689.5 kPa).

Figure 5:
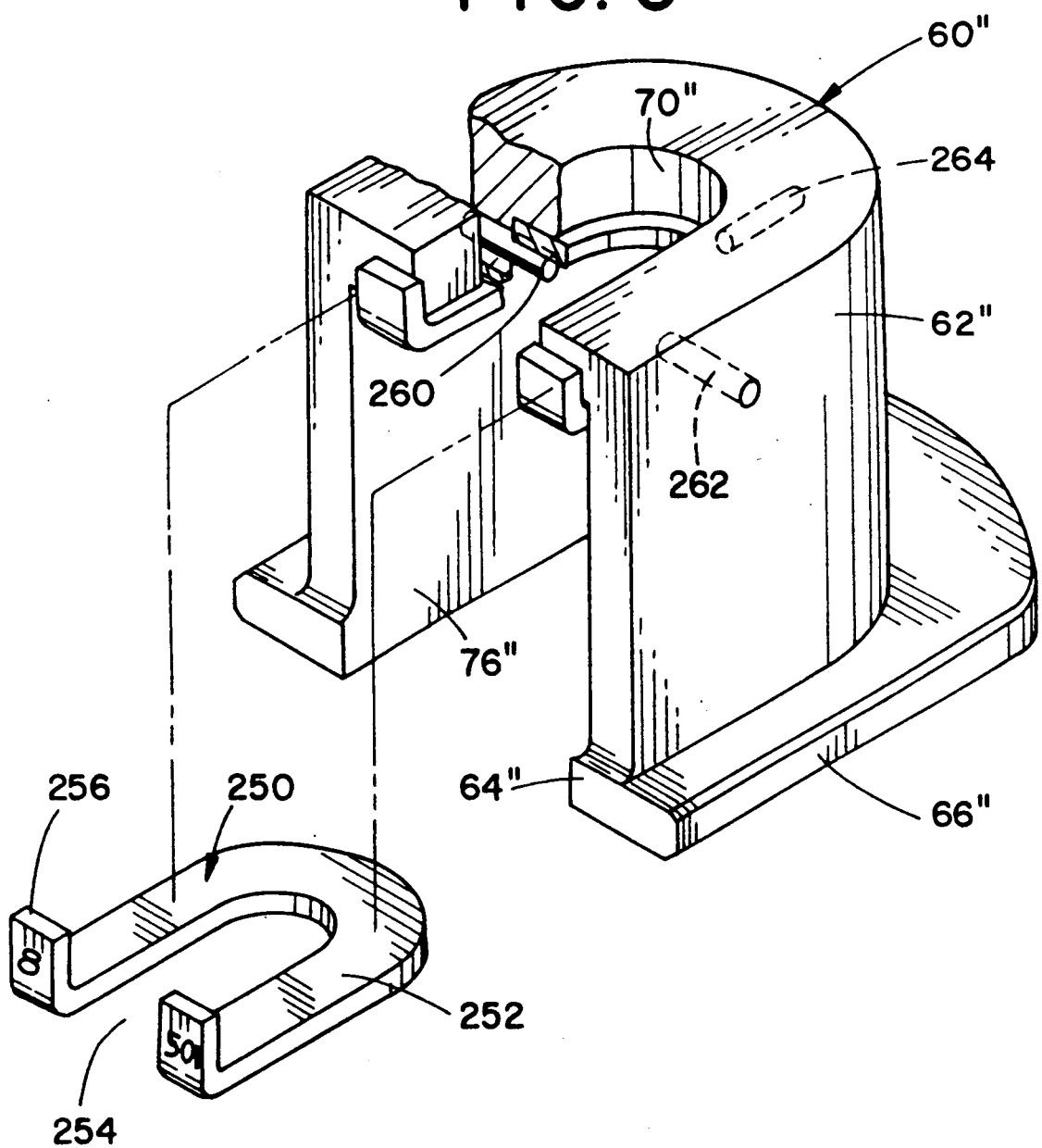

It would be advantageous if the same cap could be utilized with nuts and tubes or pipes of different diameters. FIG. 5 illustrates a cap construction which can be used for this purpose. For ease of comprehension and appreciation of this embodiment, like components will be identified by like numerals with a double primed (") suffix and new components will be identified by new numerals.

A cap or nut retainer 60" for selectively holding nuts of varying diameters mounted on tubes of appropriate diameters includes a body portion 62" having a first end 64" which is provided with an outwardly flaring section 66" and a second end 68" which extends radially inwardly to form a centrally disposed U-shaped aperture 70". A cavity 76" is formed within the cap 60". Selectively disposed in the cavity 76" is an insert 250 which preferably has a U-shaped body section 252 having a centrally disposed aperture 254 defined therein. The aperture 254 is so sized that it can accommodate a tube of a desired suitable diameter. Various inserts can be provided for tubes of differing diameters. For example, inserts for tubes having an external diameter of 6, 8 and 10 mm can be accommodated by inserts having different width apertures 254. Additionally, the inserts can be so sized that each of them can also accommodate a suitably sized inch equivalent that almost matches the metric equivalent. In other words, the 6 mm insert could also accommodate a ¼ inch diameter tube. The 8 mm diameter insert could accommodate a 5/16 inch diameter tube and the 10 mm insert could also accommodate a ⅜ inch diameter tube. The retainer aperture 70" can accommodate a 12 mm or ½ inch tube.

It is also noted that the insert can have a pair of legs 256 which extend substantially normal to the plane of the body 252. These legs are disposed at the free ends of the U-shaped body section and are meant to extend over a top face of the cap 60". The legs can have a size information written on them indicating the width of the aperture 254 and hence, what diameter tube they are meant to accommodate.

The inserts are preferably 0.062 inches in thickness. Therefore, absent the inserts, there will not be any swaging accomplished by the swaging tool since the movement of the swaging anvil or body die illustrated in FIGS. 1A and 4 will only serve in moving the appropriate nut 16 and 16' back by 0.062 inches so that little or no camming action will take place on the ferrules 10, 12 and 10', 12'. Therefore, when the cap is pulled away from what was thought to be the swaged fitting, the nut and ferrules will simply slide off the tube, thereby providing positive indication that no swaging has taken place. Also, even if the wrong insert 250 is incorporated, as long as the tube is capable of sliding into the slot 254 of the insert, a correct swaging will take place.

Preferably, also provided is a holding means for selectively retaining the insert 250 in place in the cap 60". The holding means can comprise a plurality of pins 260, 262 and 264 that are secured to the cap body 62". The first two pins, 260 and 262 hold the legs of the insert and the third pin 264 holds the base of it.

The invention has been described with reference to preferred embodiments. Obviously, alterations and modifications will occur to others upon a reading and understanding of this specification. It is intended to include all such modifications and alterations insofar as they come within the scope of the appended claims or the equivalents thereof.

Having thus described the preferred embodiment, the invention is now claimed to be:

1. A device for swaging a ferrule onto the periphery of a cylindrical member comprising:
    a first piston mounted for reciprocation within a body;
    an anvil member drivingly connected to said first piston and having a recess in one end to receive an end of the cylindrical member;
    a camming means associated with said anvil member for camming a ferrule carried on the end of the cylindrical member into tight peripheral engagement therewith; and,
    a second piston mounted for reciprocation within said body in spaced relation to said first piston, wherein a movement of said second piston is necessary in order to move said first piston and wherein an unexpandible chamber is located between said first and second pistons, said chamber holding a constant amount of fluid.

2. The device of claim 1 further comprising a gauge means for measuring the movement of said camming means relative to the body, wherein said gauge means is secured to one of said camming means and said body and comprises:
    an articulated signal member, comprising:
        a first arm,
        a second arm which is secured to one end of said first arm and is selectively pivotable thereabout,
        a means for urging said second arm to one end position in relation to said first arm, said means for urging being secured to at least one of said first arm and said second arm and being in operative connection with the other of said first arm and said second arm;
        a biasing means for moving said signal member from a first to a second position; and,
        a means for holding said signal member in said first position until a predetermined amount of relative movement has taken place between said camming means and said body at which time said signal member is caused to move suddenly to said second position under the action of said biasing means.

3. The device of claim 2 further comprising a shaft to which said first piston and anvil members are secured and wherein said gauge means further comprises a knob, wherein one of said knob and said signal member is mounted on said shaft and the other is mounted on said body.

4. The device of claim 3 wherein said means for holding comprises a latch means between said second arm and said knob for releasing said signal member to move away from said knob upon a movement of said piston through a measured distance.

5. The device of claim 4 wherein said latch means comprises an annular groove in one face of said knob and a protuberance on said second arm for projecting into said groove to hold said signal member stationary against the bias of said biasing means, wherein a radially outer wall of said groove has an approximately 5° undercut and said protuberance has a mating configuration.

6. The device of claim 1 further comprising a first biasing means for biasing said first and second pistons away from each other.

7. The device of claim 1 further comprising:
a shaft reciprocably mounted in said body to which shaft said first piston is secured and on which shaft said second piston is slidably mounted;
a first piston chamber in said body in which said first piston reciprocates;
a second piston chamber in said body in which said second piston reciprocates; and,
a second biasing means for biasing said shaft to one end position.

8. The device of claim 7 further comprising a nut retaining cap for retaining a nut positioned on the cylindrical member, said cap having a flanged outer lip and wherein said cylinder housing includes a T-slot in which said retaining cap is slidably mounted.

9. The device of claim 8 further comprising a first retaining means for securing said cap in a position coaxial with said cylinder housing bore and said base member bore.

10. The device of claim 8 further comprising a second retaining means for securing said cap in a position spaced away from being coaxial with said cylinder housing bore and said base member bore.

11. The device of claim 8 wherein said retaining cap further comprises at least two U-shaped inserts which can be separately accommodated in said cap, each insert having a central opening of a diameter suited for use with a cylindrical member of an appropriate diameter whereby cylindrical members and associated nuts of different diameters can be accommodated by a common cap through the use of different inserts.

12. The device of claim 1 wherein said anvil further comprises an indicating means for signaling both when the ferrule is missing and when the ferrule is incorrectly positioned on the cylindrical member.

13. The device of claim 1 further comprising a first stop means for preventing a movement of said first piston past a preselected first point.

14. The device of claim 1 further comprising a second stop means for preventing a movement of said second piston past a preselected second point.

15. The device of claim 1 further comprising a third stop means for preventing a movement of said anvil member past a preselected third point.

16. Apparatus for swaging a ferrule onto the periphery of a cylindrical member comprising:
a first piston mounted for reciprocation within a body;
an anvil member cooperatively associated for movement with said first piston;
a cylindrical recess in said anvil member for receiving the end of a cylindrical member and said anvil member including a camming mouth;
a means carried by said body for connection thereto of a means for (a) aligning the cylindrical member with said recess and (b) limiting an axial movement of a ferrule received over the end of the cylindrical member and a coupling nut received over the ferrule wherein said means for aligning said cylindrical member and limiting axial movement of the ferrule and the coupling nut comprises a retaining cap slidably disposed in a T-shaped slot which is provided on said body; and,
a pressure means connected in fluid communication with the interior of said body for driving said first piston toward the ferrule, said pressure means comprising a second piston.

17. The apparatus of claim 16 wherein said pressure means further comprises a fluid pump, said body including a first piston chamber in which said first piston reciprocates and a second piston chamber in which said second piston reciprocates and wherein said fluid pump communicates with said second piston chamber.

18. The apparatus of claim 17 wherein said body includes an internal wall, said wall defining a separation plane between said first and second piston chambers.

19. The apparatus of claim 17 further comprising a biasing means for biasing said first piston away from said second piston.

20. The apparatus of claim 16 wherein one end of said body includes a T-slot in which said retaining cap is adapted to slide and further comprising a retaining means for holding said retaining cap in a desired position in relation to said body.

21. The apparatus of claim 19 wherein said retaining cap comprises:
an annular body portion having first and second ends;
an outwardly flaring end section provided on the first end of said annular body portion; and,
an end wall on said second end of said annular body portion, said end wall extending radially inwardly of said annular body portion to a centrally disposed aperture opening to the interior of said annular body portion.

22. The apparatus of claim 21 wherein said retaining cap annular body portion has a cavity therein which is suitably sized so as to receive a nut received over the end of the cylindrical member.

23. The apparatus of claim 22 wherein said retaining cap further comprises:
at least one U-shaped insert which can be selectively accommodated in said cap, said at least one insert having a central opening of a diameter suited for use with a cylindrical member of an appropriate diameter so that cylindrical members, and nuts, of different diameters can be accommodated in said cap by the provision of inserts having central openings of an appropriate diameter; and,
a retaining means for selectively retaining said at least one insert in said cap.

24. The apparatus of claim 22 wherein said anvil member is substantially cylindrical in shape and has an outer diameter just smaller than an inner diameter of the nut so that said anvil can extend within the nut.

25. Apparatus for pre-swaging to the outer surface of a cylindrical member the ferrules of fittings of the type including a threaded coupling nut having an internal opening and adapted to encircle the cylindrical member and an associated ferrule positioned on the cylindrical member, said apparatus comprising:
a first means for engaging and positioning the end of a cylindrical member on which the fitting is connected;
a camming means associated with said first means and sized to extend inwardly from the end of said member between the outer periphery of the member and the internal opening of the coupling nut;
a second means for engaging said coupling nut, said second means comprising a retaining cap that is slidably disposed in a T-shaped slot such that the cap selectively encloses said coupling nut; and, a power means for producing a relative movement toward one another of said camming means and the coupling nut to cause a ferrule positioned therebetween to be swaged on the outer surface of said cylindrical member, said power means comprising:
a first piston, and
a second piston spaced from said first piston.

26. The apparatus of claim 25 wherein a ratio of surface areas of said first and second pistons acting on a fluid located between said pistons is greater than approximately 5 to 1.

27. The apparatus of claim 26 wherein said ratio of surface areas is approximately 16 to 1.

28. The apparatus as defined in claim 25 wherein said first means comprises a recess sized to receive said cylindrical member and wherein said camming means is positioned about said recess.

29. The apparatus as defined in claim 25 further comprising a means for indicating when sufficient relative movement has taken place between said camming means and the coupling nut.

30. The apparatus of claim 25 wherein said retaining cap comprises:
an annular body portion having first and second ends;
an outwardly flaring end section provided on the first end of said annular body portion; and,
an end wall located on said second end of said annular body portion, said end wall extending radially inwardly of said annular body portion to a centrally disposed aperture opening to the interior of said annular body portion.

31. The apparatus of claim 30 further comprising a body in which said T-shaped slot is defined and said first means is reciprocatingly mounted and wherein said retaining cap has a flanged outer lip for slidably mounting said cap in said T-shaped slot.

32. The apparatus of claim 31 further comprising a locking means for selectively securing said retaining cap in a preselected position in said cylinder housing T-slot.

33. A swaging tool for swaging a ferrule onto an outer periphery of a cylindrical member, the tool comprising:
a swaging anvil for swaging the ferrule onto the outer periphery of the cylindrical member;
a frame for supporting and aligning said swaging anvil with the cylindrical member, wherein said swaging anvil can selectively move with respect to said frame; and,
independently actuated signal means operably secured to one of said frame and said swaging anvil for indicating adequate swaging of the ferrule in response to a gauged relative movement between said frame and said swaging anvil, said signal means including:
an articulated signal member comprising:
a first arm,
a second arm which is secured to one end of said first arm and is selectively pivotable thereabout,
a means for urging said second arm to one end position in relation to said first arm,
a latching means for securing said signal member in one end position, and
a means for biasing said signal member to swing away from said one end position upon adequate swaging of said ferrule.

34. The tool of claim 33 wherein said latching means includes a protuberance projecting from said second arm into a groove in a knob which recedes from said protuberance as the swaging operation progresses.

35. The tool of claim 34 wherein a length of engagement of said protuberance in said groove is substantially equal to the length of the relative movement between said frame means and said swaging means to cause adequate swaging.

36. The tool of claim 34 wherein said knob is operatively connected to said swaging means.

37. The tool of claim 36 further comprising:
a shaft extending in said frame, wherein both said swaging anvil and said knob are fixedly secured to said shaft;
a biasing means for resiliently urging said shaft in a first direction in said frame; and,
a pressure means for selectively urging said shaft in a second direction in opposition to said biasing means.

38. The tool of claim 37 wherein said pressure means comprises a first piston which is actuated by a pressurized fluid to move in said second direction.

39. The tool of claim 38 wherein said pressure means further comprises a second piston which pressurizes said pressurized fluid that actuates said first piston.

40. The tool of claim 33 further comprising a base on which said frame can be mounted.

41. A device for swaging a ferrule onto the periphery of a cylindrical member comprising:
a first piston mounted for reciprocation within a body;
an anvil member drivingly connected to said first piston and having a recess in one end to receive an end of the cylindrical member;
a camming means associated with said anvil member for camming a ferrule carried on the end of the cylindrical member into tight peripheral engagement therewith;
a second piston mounted for reciprocation within said body in spaced relation to said first piston, wherein a movement of said second piston is necessary in order to move said first piston; and,
a mechanical resilient means for urging said first and second pistons away from each other, said mechanical resilient means being located between said first and second pistons.

42. The device of claim 41 further comprising a nut retaining cap for retaining a nut positioned on the cylindrical member, said cap having a flanged outer lip and wherein said cylinder housing includes a T-slot in which said retaining cap is slidably mounted.

43. The device of claim 41 wherein said anvil further comprises an indicating means for signaling both when the ferrule is missing and when the ferrule is incorrectly positioned on the cylindrical member.

44. The device of claim 41 further comprising a gauge means for measuring the movement of said camming means relative to the body, wherein said gauge means is secured to one of said camming means and said body and comprises:
an articulated signal member, comprising:
a first arm
a second arm which is secured to one end of said first arm and is selectively pivotable thereabout,
a means for urging said second arm to one end position in relation to said first arm, said means for urging being secured to at least one of said first arm and said second arm and being in operative connection with the other of said first arm and said second arm;
a biasing means for moving said signal member from a first to a second position; and,
a means for holding said signal member in said first position until a predetermined amount of relative movement has taken place between said camming means and said body at which time said signal member is caused to move suddenly to said second position under the action of said biasing means.

45. The device of claim 41 further comprising:
a shaft reciprocally mounted in said body to which shaft said first piston is secured and on which shaft said second piston is slidably mounted;
a first piston chamber in said body in which said first piston reciprocates;
a second piston chamber in said body in which said second piston reciprocates; and,
a biasing means for urging said shaft to one end position.

46. The device of claim 45 wherein said first piston chamber is unexpandible and holds a constant amount of a fluid.

47. The device of claim 45 wherein said mechanical resilient means comprises a spring which is coiled around said shaft.

48. The device of claim 41 further comprising a first stop means for preventing a movement of said first piston past a preselected first point.

49. The device of claim 41 further comprising a second stop means for preventing a movement of said second piston past a preselected second point.

50. The device of claim 41 further comprising a third stop means for preventing a movement of said anvil member past a preselected third point.

* * * * *